United States Patent
Choi et al.

(10) Patent No.: US 9,743,061 B2
(45) Date of Patent: Aug. 22, 2017

(54) MULTIVIEW VIDEO ENCODING METHOD AND DEVICE, AND MULTIVIEW VIDEO DECODING METHOD AND DEVICE

(71) Applicant: SAMSUNG ELECTRONICS CO., LTD., Suwon-si (KR)

(72) Inventors: Byeong-doo Choi, Siheung-si (KR); Jae-hyun Kim, Seoul (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 327 days.

(21) Appl. No.: 14/521,860

(22) Filed: Oct. 23, 2014

(65) Prior Publication Data
US 2015/0043656 A1 Feb. 12, 2015

Related U.S. Application Data

(63) Continuation of application No. PCT/KR2013/003471, filed on Apr. 23, 2013.
(Continued)

(51) Int. Cl.
*H04N 19/597* (2014.01)
*H04N 13/00* (2006.01)
(Continued)

(52) U.S. Cl.
CPC ......... *H04N 13/0003* (2013.01); *H04N 19/46* (2014.11); *H04N 19/597* (2014.11); *H04N 19/61* (2014.11)

(58) Field of Classification Search
CPC combination set(s) only.
See application file for complete search history.

(56) References Cited

U.S. PATENT DOCUMENTS

| | | | |
|---|---|---|---|
| 8,165,216 B2 | 4/2012 | Chen et al. | |
| 2008/0317124 A1* | 12/2008 | Cho | H04N 19/597 375/240.08 |

(Continued)

FOREIGN PATENT DOCUMENTS

| | | |
|---|---|---|
| CN | 101548550 A | 9/2009 |
| CN | 101569197 A | 10/2009 |

(Continued)

OTHER PUBLICATIONS

Communication issued Dec. 7, 2015, issued by the European Patent Office in counterpart European Patent Application No. 13780629.5.
(Continued)

*Primary Examiner* — Sath V Perungavoor
*Assistant Examiner* — Janese Duley
(74) *Attorney, Agent, or Firm* — Sughrue Mion, PLLC

(57) ABSTRACT

Provided are a method and apparatus for decoding a multiview video and a method and apparatus for encoding a multiview video. The decoding method includes: receiving multiview image streams that configure the multiview video; obtaining, from a predetermined data unit header that includes information of a base-view picture included in a base-view image stream, picture order count (POC) information of the base-view picture; determining, using the POC information of the base-view picture, a POC of the base-view picture, based on an instantaneous decoding refresh (IDR) picture of a base-view; and determining, using the POC of the base-view picture, a POC of an additional-view picture that is included in a same access unit as the base-view picture and is transmitted.

5 Claims, 18 Drawing Sheets

Related U.S. Application Data

(60) Provisional application No. 61/636,874, filed on Apr. 23, 2012.

(51) Int. Cl.
*H04N 19/46* (2014.01)
*H04N 19/61* (2014.01)

(56) References Cited

U.S. PATENT DOCUMENTS

| | | | |
|---|---|---|---|
| 2010/0091881 | A1 | 4/2010 | Pandit et al. |
| 2014/0023144 | A1 | 1/2014 | Park et al. |
| 2016/0191950 | A1 | 6/2016 | Pandit et al. |

FOREIGN PATENT DOCUMENTS

| | | |
|---|---|---|
| CN | 101653001 A | 2/2010 |
| EP | 2 469 862 A2 | 6/2012 |
| KR | 10-2008-0114500 A | 12/2008 |
| KR | 10-0941608 B1 | 2/2010 |
| KR | 10-2011-0019322 A | 2/2011 |
| KR | 10-2011-0113583 A | 10/2011 |
| KR | 10-2012-0019751 A | 3/2012 |
| WO | 2011021768 A2 | 2/2011 |

OTHER PUBLICATIONS

Choi, et al., "POC Signaling for CRA picture", Joint Collaborative Team on Video Coding, 9th Meeting, Apr. 27, 2012-May 7, 2012, Geneva, Switzerland, pp. 1-4, XP 030111896.

Nakamura, et al., "Multiview video coding using existing AVC decoder", Joint Video Team of ISO/IEC MPEG & ITU-T VCEG, 24th Meeting, Jun. 29, 2007-Jul. 5, 2007, Geneva, Switzerland, 10 pages total, XP 030007146.

Koyama, et al., "Cyclic POC", Joint Collaborative Team on Video Coding, 9th Meeting, Apr. 27, 2012-May 7, 2012, Geneva Switzerland, 4 pages total, XP 030111808.

Communication, Issued by the International Searching Authority, Dated Aug. 26, 2013, in counterpart International Application No. PCT/KR2013/003471.

Communication dated May 3, 2017 issued by the State Intellectual Property Office of P.R. China in counterpart Chinese Patent Application No. 201380033366.2.

\* cited by examiner

FIG. 7
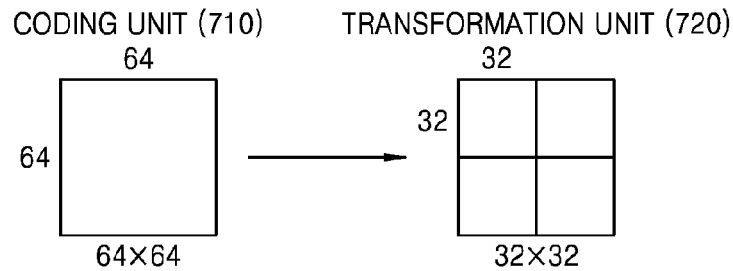
FIG. 8
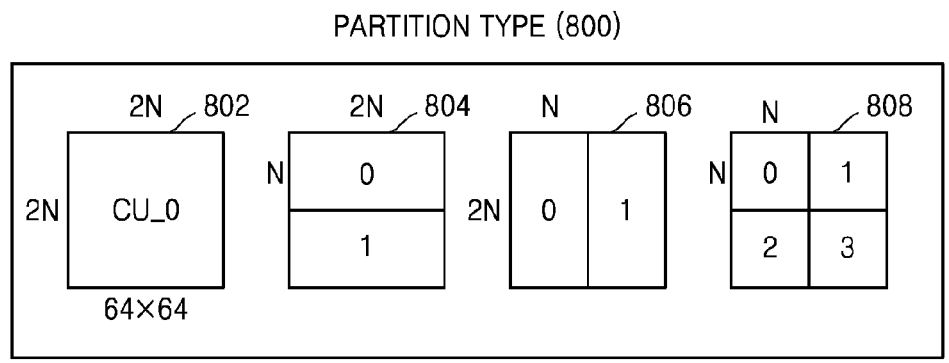
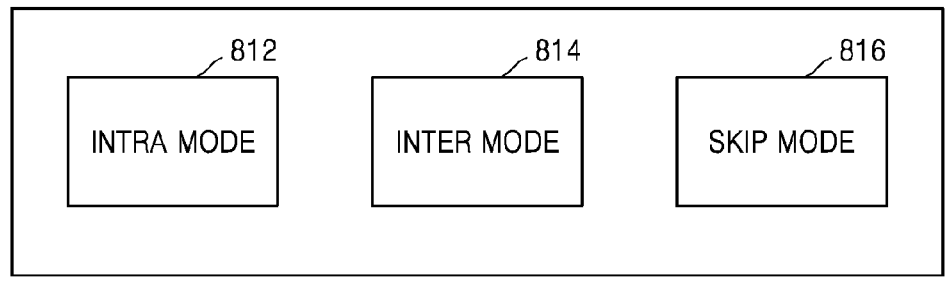
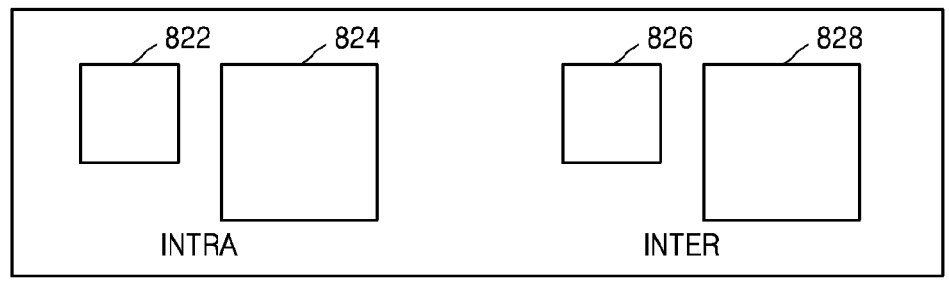

CODING UNIT (1010)

FIG. 17

| nal_unit_type | Content of NAL unit and RBSP syntax structure |
|---|---|
| 0<br>1 | Coded slice segment of a non-TSA, non-STSA trailing picture<br>slice_segment_layer_rbsp( ) |
| 2<br>3 | Coded slice segment of a TSA picture<br>slice_segment_layer_rbsp( ) |
| 4<br>5 | Coded slice segment of an STSA picture<br>slice_layer_rbsp( ) |
| 6<br>7 | Coded slice segment of a RADL picture<br>slice_layer_rbsp( ) |
| 8<br>9 | Coded slice segment of a RASL picture<br>slice_layer_rbsp( ) |
| 10<br>12<br>14 | Reserved |
| 11<br>13<br>15 | Reserved // reserved non-RAP sub-layer reference<br>VCL NAL unit types |
| 16<br>17<br>18 | Coded slice segment of a BLA picture<br>slice_segment_layer_rbsp( ) |
| 19<br>20 | Coded slice segment of an IDR picture<br>slice_segment_layer_rbsp( ) |
| 21 | Coded slice segment of a CRA picture<br>slice_segment_layer_rbsp( ) |
| 22<br>23 | Reserved |
| 24..31 | Reserved |
| 32 | Video parameter set<br>video_parameter_set_rbsp( ) |
| 33 | Sequence parameter set<br>seq_parameter_set_rbsp( ) |
| 34 | Picture parameter set<br>pic_parameter_set_rbsp( ) |
| 35 | Access unit delimiter<br>access_unit_delimiter_rbsp( ) |
| 36 | End of sequence<br>end_of_seq_rbsp( ) |
| 37 | End of bitsteam<br>end_of_bitstream_rbsp( ) |
| 38 | Filler data<br>filler_data_rbsp( ) |
| 39<br>40 | Supplemental enhancement information (SEI)<br>sei_rbsp( ) |
| 41..47 | Reserved |
| 48..63 | Unspecified |

FIG. 18

| slice_header( ) { | Descriptor |
|---|---|
| ............... | u(1) |
| if( IdrPicFlag ) { | |
| idr_pic_id | ue(1) |
| ... | |
| } else { | |
| if( nal_unit_type == 4 ) | |
| 1810 — pic_order_cnt_msb | u(v) |
| 1820 — pic_order_cnt_lsb | u(v) |
| ............... | |
| } | |

FIG. 19

| slice_header( ) { | Descriptor |
|---|---|
| ............... | u(1) |
| if( IdrPicFlag ) { | |
| idr_pic_id | ue(1) |
| ... | |
| } else { | |
| if( nal_unit_type == 4 ) | |
| 1910 — pic_order_cnt_msb_cycle | u(v) |
| 1920 — pic_order_cnt_lsb | u(v) |
| ............... | |
| } | |

MULTIVIEW VIDEO ENCODING METHOD AND DEVICE, AND MULTIVIEW VIDEO DECODING METHOD AND DEVICE

CROSS-REFERENCE TO RELATED APPLICATIONS

This application is a continuation of PCT/KR2013/003471, filed on Apr. 23, 2013, which claims the benefit of U.S. Provisional Application No. 61/636,874, filed on Apr. 23, 2012, all the disclosures of which are incorporated herein in their entireties by reference.

1. Field

Apparatuses and methods consistent with exemplary embodiments relate to encoding and decoding a video, and more particularly, to a high level syntax structure for signaling picture order count (POC) information for synchronization between pictures of a multiview video.

2. Description of the Related Art

Image data is encoded by a codec based on a predetermined data compression standard, e.g., the Moving Picture Experts Group (MPEG) standard, and is then stored as a bitstream in an information storage medium or is transmitted via a communication channel.

Recently, as three-dimensional (3D) multimedia devices and 3D multimedia content are increasingly supplied, a multiview video coding technology for coding a 3D video has become widely spread.

However, multiview video coding increases a data amount, as compared to a uni-view video, thus, there is a demand for an efficient coding method of decreasing the data mount of a multiview video. Also, there is a demand for synchronization between images of each of views included in the multiview video.

SUMMARY

Aspects of one or more exemplary embodiments provide a method of efficiently signaling picture order count (POC) information that is used in encoding and decoding a multiview video.

Furthermore, aspects of one or more exemplary embodiments provide synchronization between images of each of views while pictures that are included in a multiview video and correspond to each other maintain an equal POC even when the pictures are inter-view switched or inter-view accessed in a random manner.

Moreover, aspects of one or more exemplary embodiments involve equally limiting types of a base-view picture and an additional-view picture included in a same access unit, and determining a picture order count (POC) of the additional-view picture by using a POC of the base-view picture.

According to aspects of one or more exemplary embodiments, synchronization is possible between pictures that have to be displayed at a same point of time in a multiview video. Also, according to aspects of one or more exemplary embodiments, even when inter-view switching or random access is performed, synchronization is possible between pictures of a same point of time that construct a multiview video.

According to an aspect of an exemplary embodiment, there is provided a method of decoding a multiview video, the method including: receiving multiview image streams that configure the multiview video; obtaining, from a predetermined data unit header including information of a base-view picture included in a base-view image stream, picture order count (POC) information of the base-view picture; determining, using the POC information of the base-view picture, a POC of the base-view picture, based on an instantaneous decoding refresh (IDR) picture of a base-view; and determining, using the POC of the base-view picture, a POC of an additional-view picture that is included in a same access unit as the base-view picture and is transmitted.

According to an aspect of another exemplary embodiment, there is provided a multiview video decoding apparatus, including: a receiver configured to receive multiview image streams that configure a multiview video, obtain, from a predetermined data unit header including information of a base-view picture included in a base-view image stream, picture order count (POC) information of the base-view picture, determine, using the POC information of the base-view picture, a POC of the base-view picture, based on an instantaneous decoding refresh (IDR) picture of a base-view, and determine, using the POC of the base-view picture, a POC of an additional-view picture that is included in a same access unit as the base-view picture and is transmitted; and a multiview image decoder configured to decode the received multiview image streams of the multiview video.

According to an aspect of another exemplary embodiment, there is provided a method of encoding a multiview video, the method including: generating multiview image streams by encoding multiview images that configure the multiview video; adding, to a predetermined data unit header including information of a base-view picture that is included in a base-view image stream, picture order count (POC) information of the base-view picture; skipping a procedure of encoding POC information of an additional-view picture having a same POC as the base-view picture, and multiplexing, as a same access unit, the base-view picture and the additional-view picture that have the same POC; and outputting the base-view picture and the additional-view picture.

According to an aspect of another exemplary embodiment, there is provided a multiview video encoding apparatus, including: a multiview image encoder configured to generate multiview image streams by encoding multiview images that configure the multiview video; and an output unit configured to add, to a predetermined data unit header including information of a base-view picture that is included in a base-view image stream, picture order count (POC) information of a base-view picture, skip a procedure of encoding POC information of an additional-view picture having a same POC as the base-view picture, multiplex, as a same access unit, the base-view picture and the additional-view picture that have the same POC, and output the base-view picture and the additional-view picture.

DESCRIPTION OF THE DRAWINGS

FIG. 7 is a diagram for describing a relationship between a coding unit and transformation units, according to an exemplary embodiment;

FIG. 8 illustrates a plurality of pieces of encoding information according to depths, according to an exemplary embodiment;

FIG. 17 illustrates types of an NAL unit based on values of an identifier (i.e., nal_unit_type) of the NAL unit;

FIG. 18 illustrates slice header information of a clean random access (CRA) picture that is included in an NAL unit and is transmitted, according to an exemplary embodiment;

FIG. 19 illustrates slice header information of a CRA picture that is included in an NAL unit and is transmitted, according to another exemplary embodiment;

DETAILED DESCRIPTION OF EXEMPLARY EMBODIMENTS

Hereinafter, a video encoding technique and a video decoding technique based on coding units of a tree structure, according to one or more exemplary embodiments, will be described with reference to FIGS. 1 through 13. Also, a multiview video encoding technique and a multiview video decoding technique based on coding units of a tree structure, according to one or more exemplary embodiments, will be described with reference to FIGS. 14 through 22.

First, the video encoding technique and the video decoding technique based on coding units of a tree structure will be described with reference to FIGS. 1 through 13.

Figure 1:
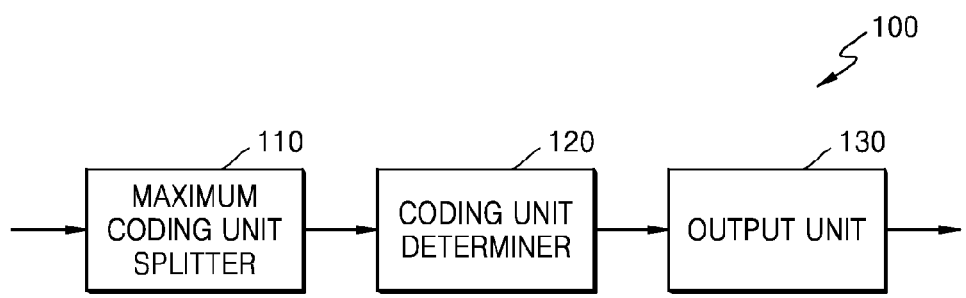
FIG. 1 is a block diagram of a video encoding apparatus based on coding units of a tree structure, according to an exemplary embodiment.

FIG. 1 is a block diagram of a video encoding apparatus based on coding units of a tree structure 100, according to an exemplary embodiment.

The video encoding apparatus involving video prediction based on coding units of the tree structure 100 includes a maximum coding unit splitter 110, a coding unit determiner 120, and an output unit 130 (e.g., outputter). Hereinafter, for convenience of description, the video encoding apparatus involving video prediction based on coding units of the tree structure 100 is referred as 'video encoding apparatus 100'.

The maximum coding unit splitter 110 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to one or more exemplary embodiments, will be described in detail below with reference to FIGS. 3 through 13.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit according to an exemplary embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction, prediction information, and slice type information, which are described above with reference to FIGS. 1 through 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a related art macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
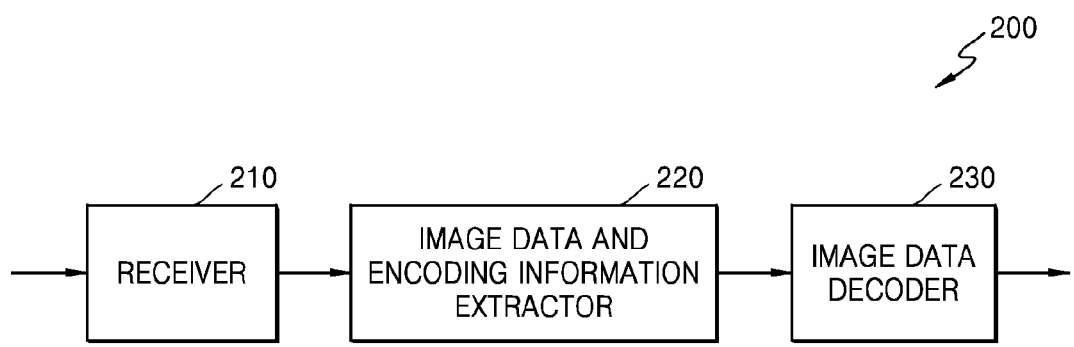
FIG. 2 is a block diagram of a video decoding apparatus based on coding units of a tree structure, according to an exemplary embodiment.

FIG. 2 is a block diagram of a video decoding apparatus based on coding units of a tree structure 200, according to an exemplary embodiment.

The video decoding apparatus involving video prediction based on coding units of the tree structure 200 includes a receiver 210, an image data and encoding information extractor 220, and an image data decoder 230. Hereinafter, for convenience of description, the video decoding apparatus involving video prediction based on coding units of the tree structure 200 is referred as 'video decoding apparatus 200'.

Definitions of various terms, such as a coding unit, a depth, a prediction unit, a transformation unit, and information about various encoding modes, for decoding operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be restored.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 3:
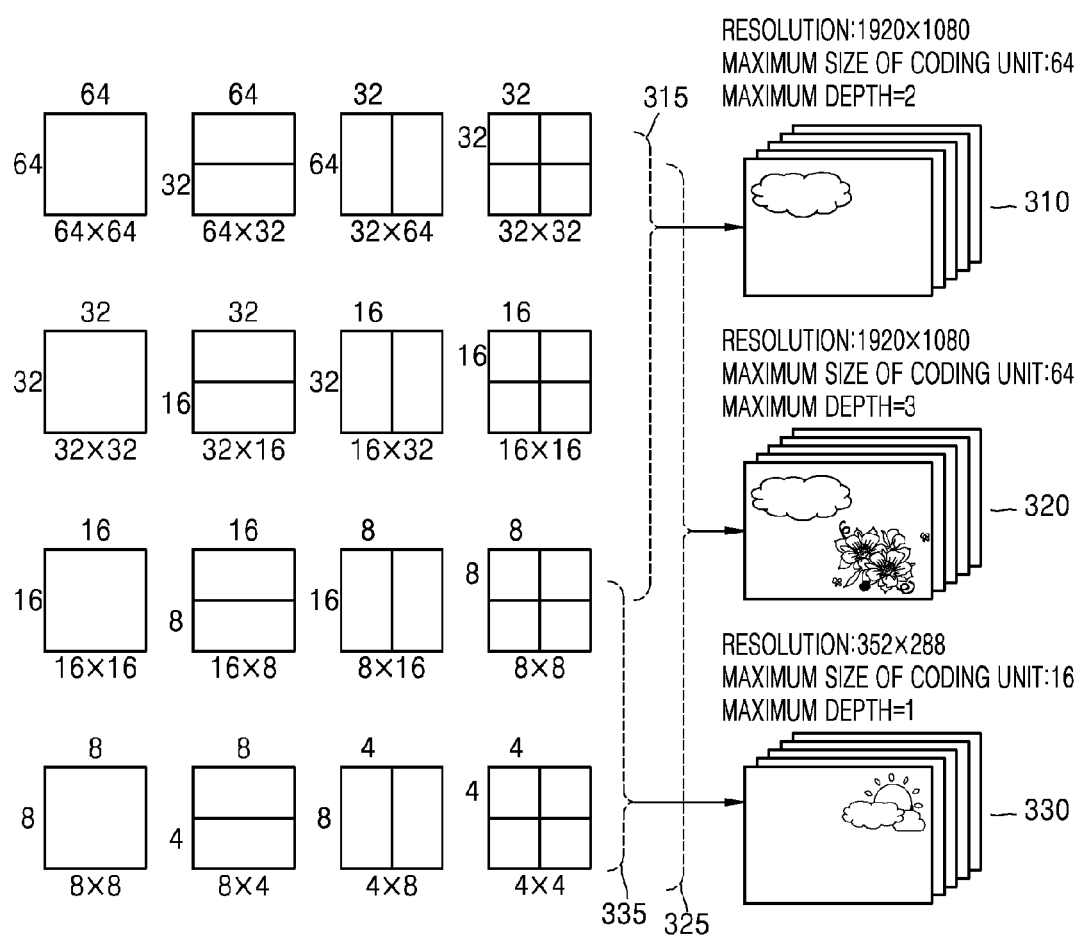
FIG. 3 is a diagram for describing a concept of coding units according to an exemplary embodiment.

FIG. 3 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. On the other hand, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
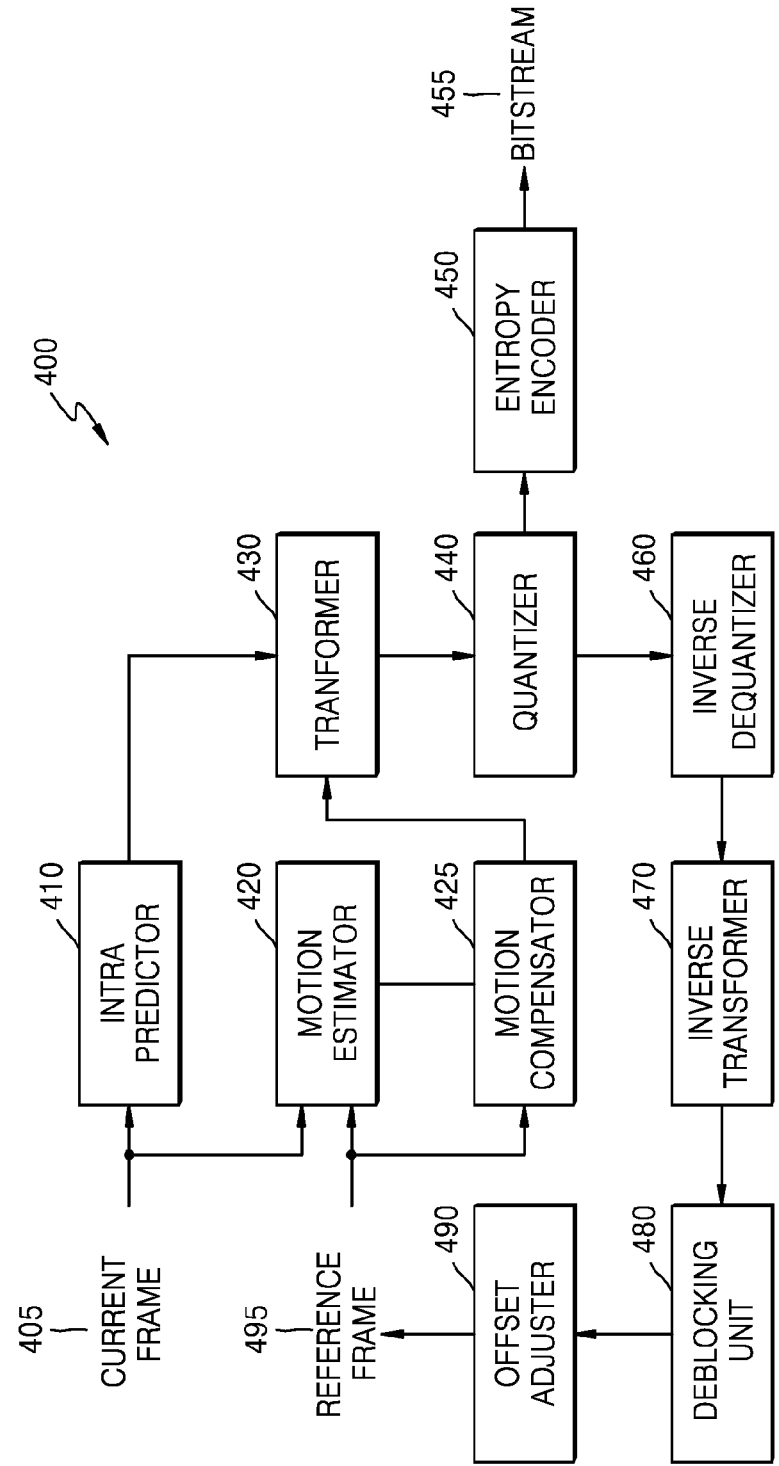
FIG. 4 is a block diagram of an image encoder based on coding units, according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 (e.g., deblocker) and an offset adjusting unit 490 (e.g., offset adjuster). The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the offset adjusting unit 490 perform operations based on each coding unit among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
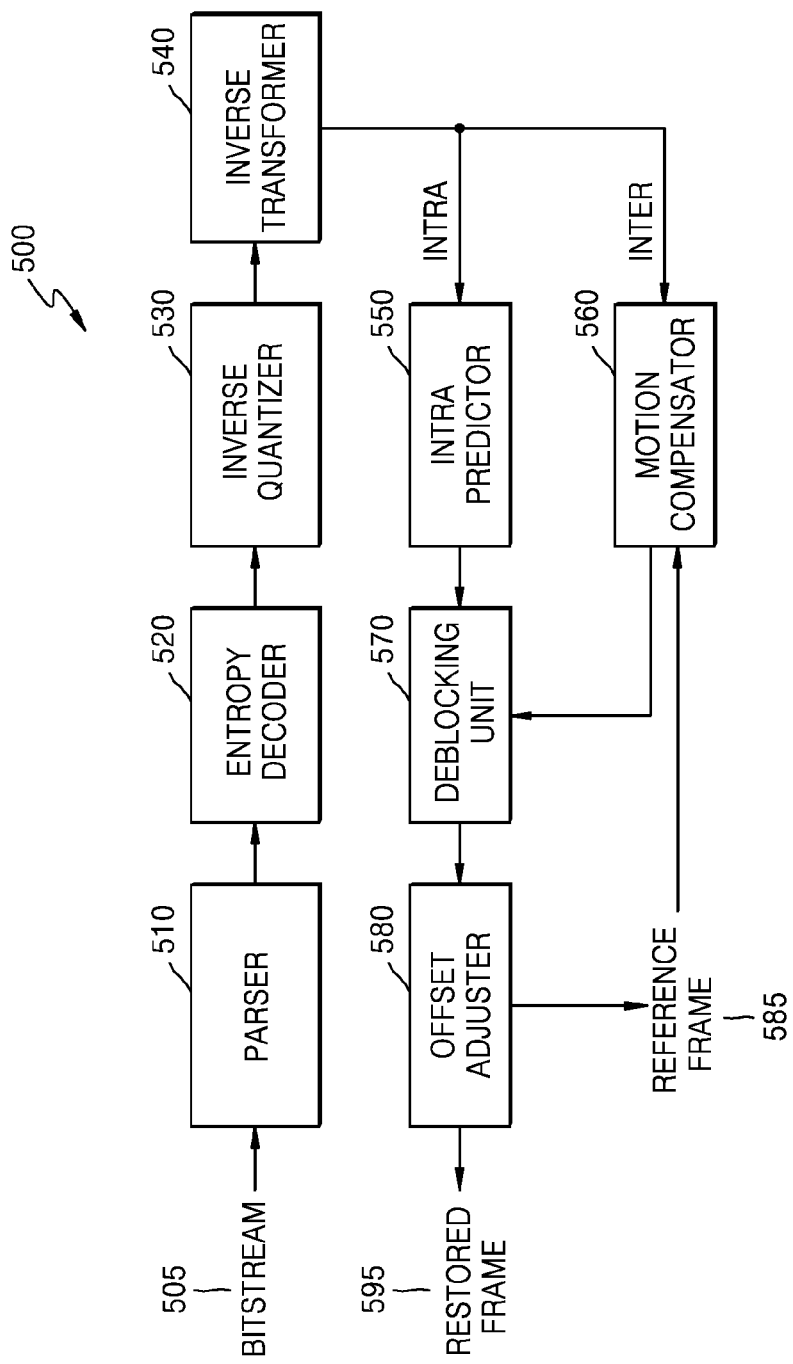
FIG. 5 is a block diagram of an image decoder based on coding units, according to an embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 (e.g., deblocker) and an offset adjusting unit 580 (e.g., offset adjuster). Also, the image data that is post-processed through the deblocking unit 570 and the offset adjusting unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the offset adjusting unit 580 perform operations based on coding units having a tree structure for each maximum coding unit.

Specifically, the intra prediction 550 and the motion compensator 560 have to determine partitions and a prediction mode for each of the coding units having a tree structure, and the inverse transformer 540 have to determine a size of a transformation unit for each coding unit.

Figure 6:
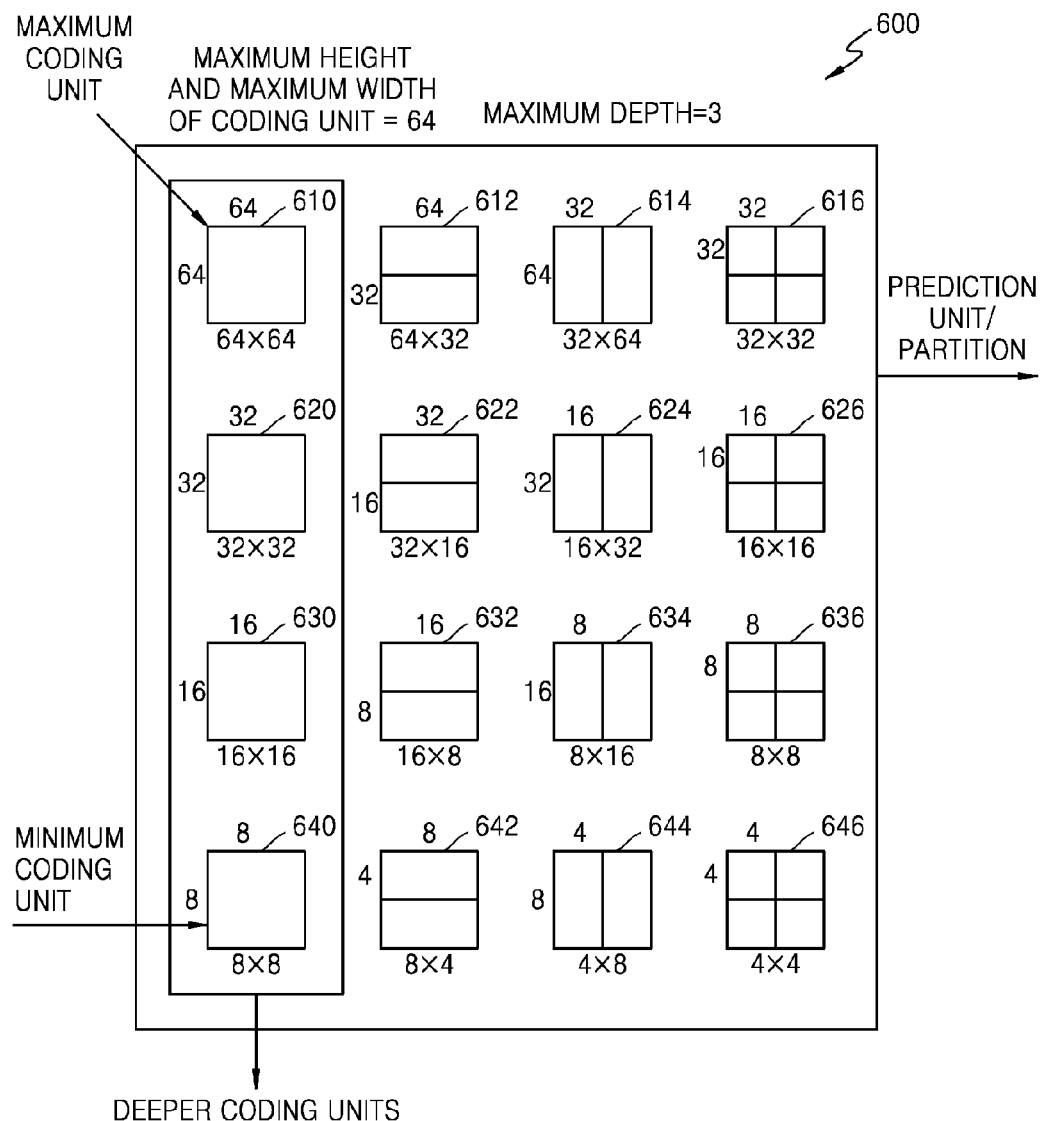
FIG. 6 is a diagram illustrating deeper coding units according to depths, and partitions, according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth refers to a total number of times the coding unit is split from the maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth.

In other words, if the coding unit 610 having a size of 64×64 and a depth of 0 is a prediction unit, the prediction unit may be split into partitions include in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

Lastly, the coding unit 640 having the size of 8×8 and the depth of 3 is a minimum coding unit having a lowermost depth.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 600. Alternatively, the minimum encoding error may be searched for by comparing representative encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 illustrates a plurality of pieces of encoding information according to depths, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 9:
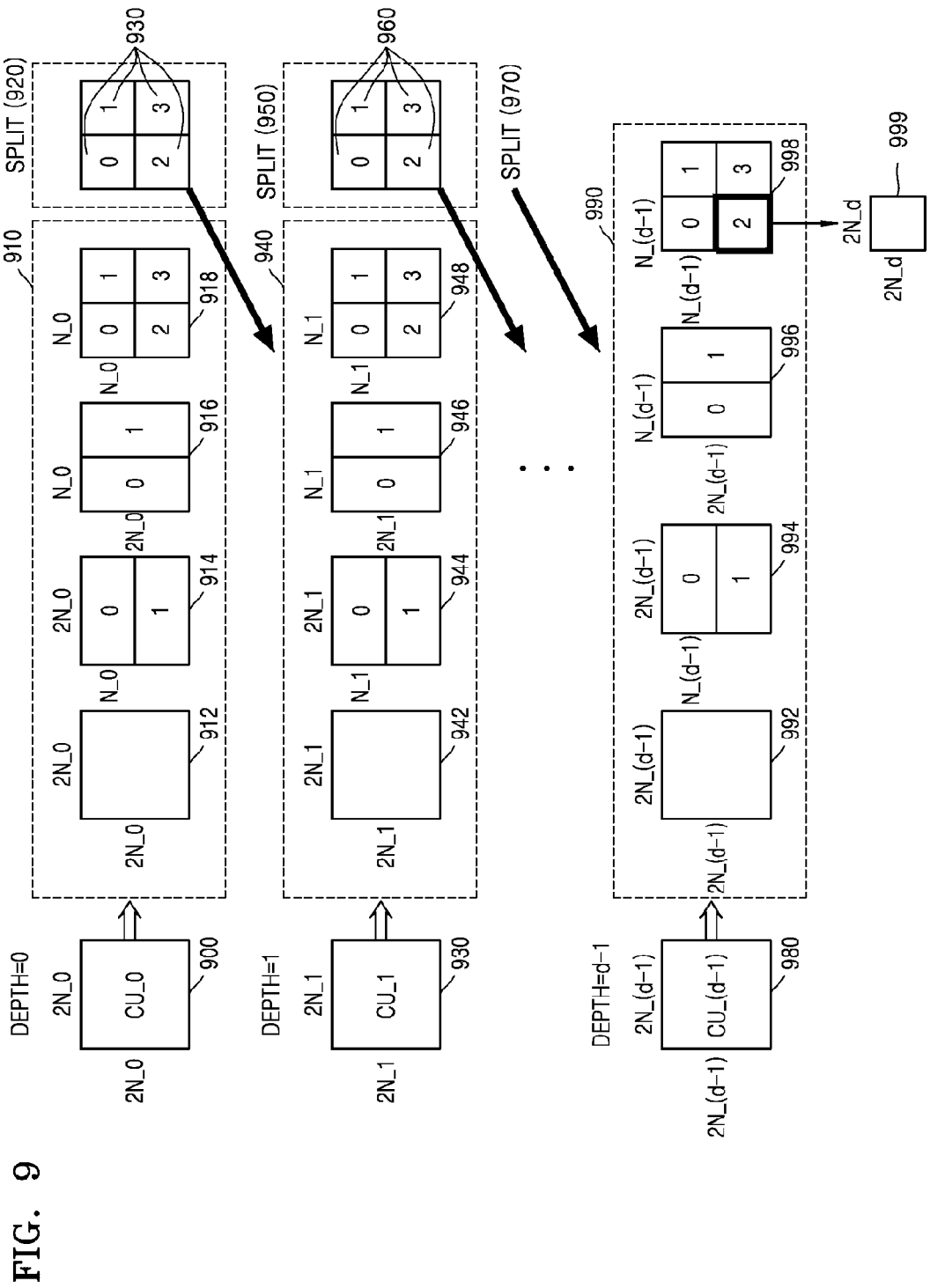
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit having a lowermost coded depth by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0, 1, . . . , d−1, d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
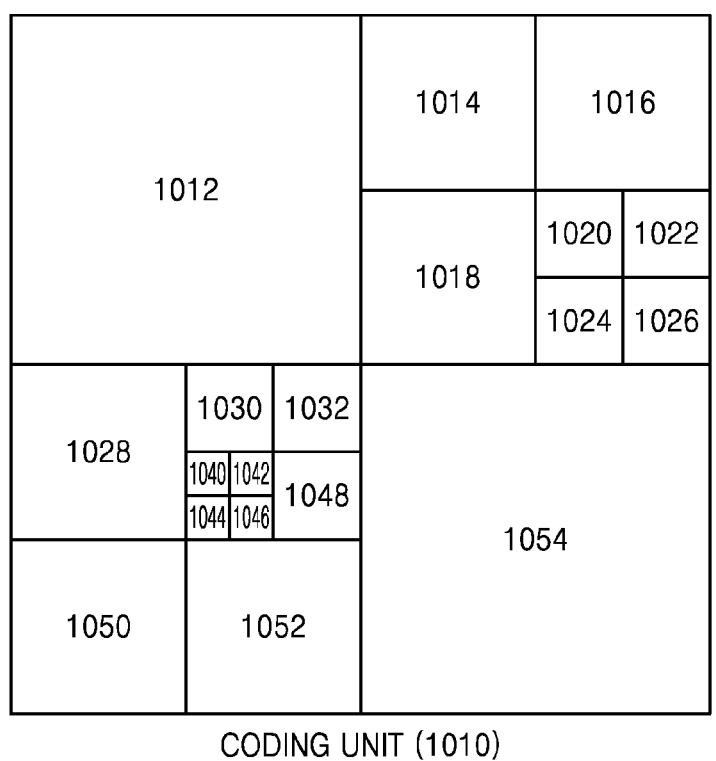
FIGS. 10, 11, and 12 are diagrams for describing a relationship between coding units, prediction units, and transformation units, according to an exemplary embodiment.
Figure 11:
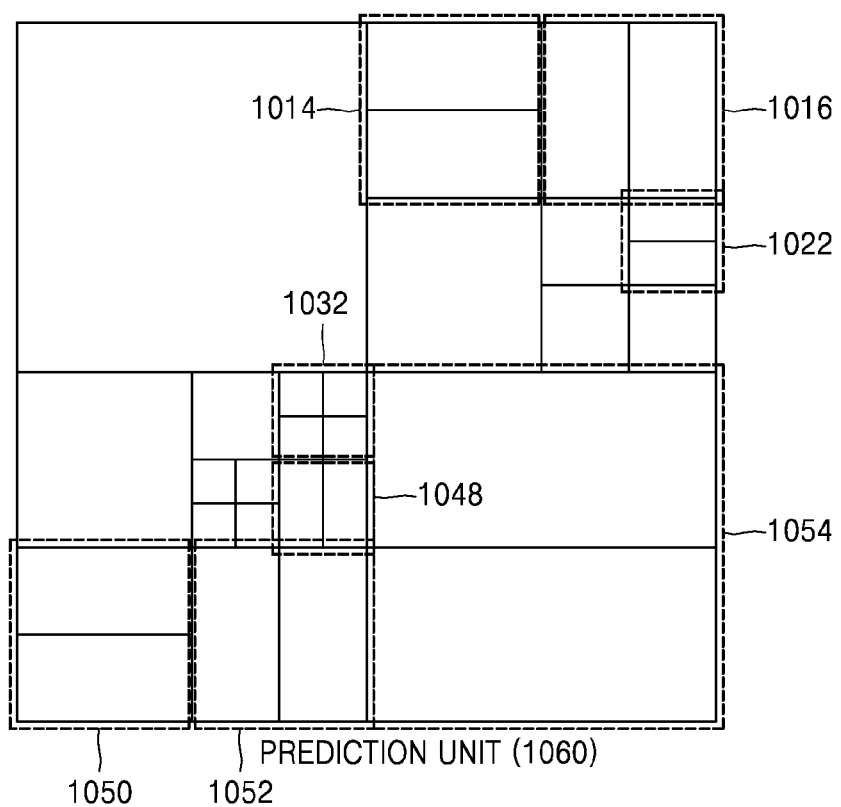
Figure 12:
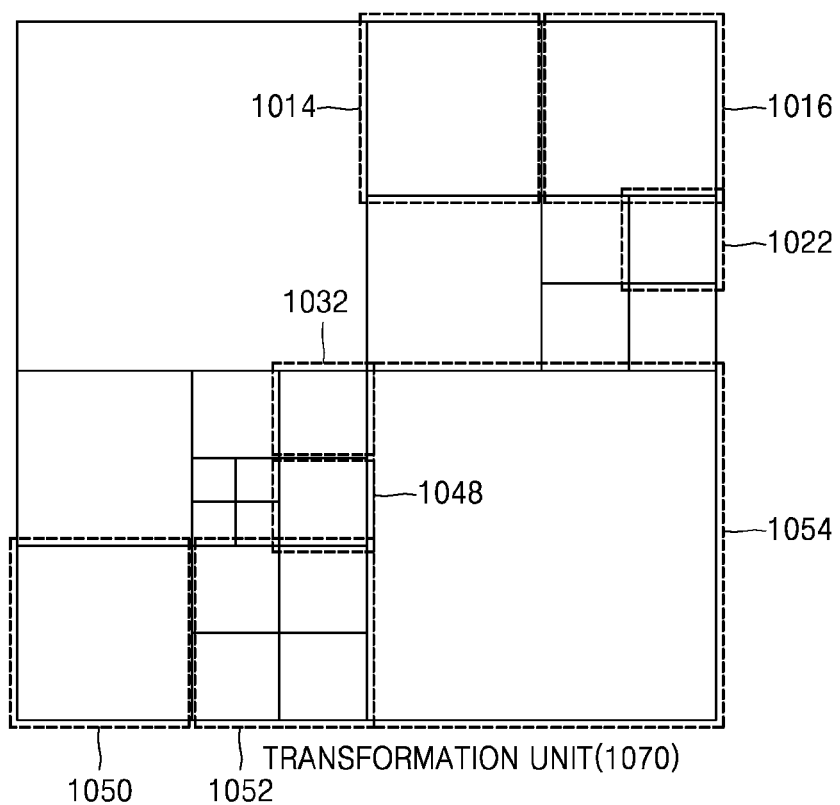

FIGS. 10, 11, and 12 are diagrams for describing a relationship between coding units 1010, prediction units 1060, and transformation units 1070, according to an exemplary embodiment.

The coding units 1010 are deeper coding units according to depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2Nx2N and Current Depth of d)

| Prediction Mode | Partition Type | | Size of Transformation Unit | | | Split Information 1 |
|---|---|---|---|---|---|---|
| | Symmetrical Partition Type | Asymmetrical Partition Type | Split Information 0 of Transformation Unit | Split Information 1 of Transformation Unit | | |
| Intra Inter Skip (Only 2Nx2N) | 2Nx2N 2NxN Nx2N NxN | 2NxnU 2NxnD nLx2N nRx2N | 2Nx2N | NxN (Symmetrical Partition Type) N/2xN/2 (Asymmetrical Partition Type) | | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
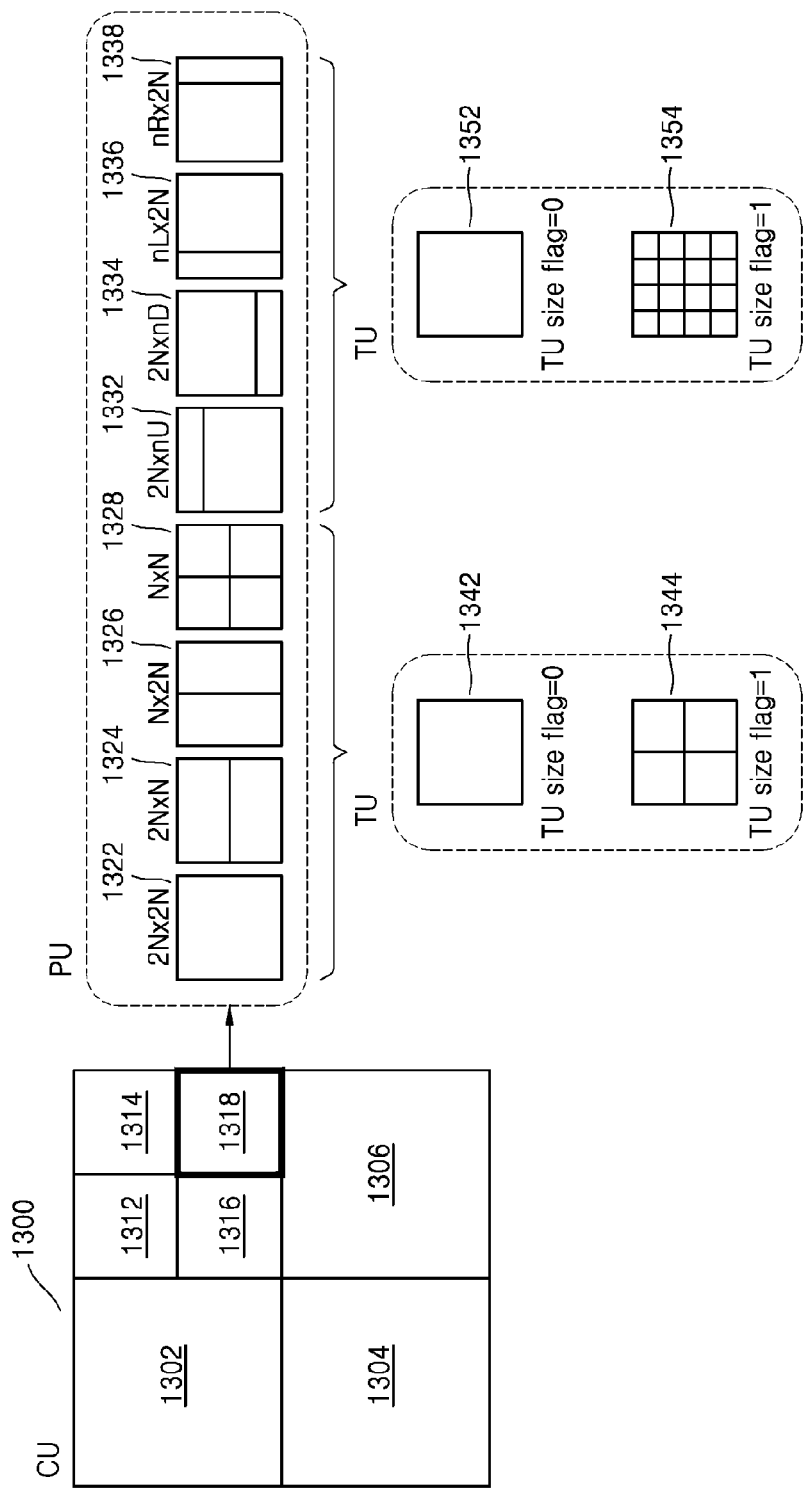
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e., the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332 having the size of 2N×nU, the partition type 1334 having the size of 2N×nD, the partition type 1336 having the size of nL×2N, or the partition type 1338 having the size of nR×2N, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to a flag having 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

The maximum coding unit that includes coding units of the tree structure described above with reference to FIGS. 1 through 13 may be variously referred as a coding block tree, a block tree, a root block tree, a coding tree, a coding root, or a tree trunk.

Hereinafter, a multiview video encoding technique and a multiview video decoding technique according to one or more exemplary embodiments will now be disclosed.

Data that was encoded by a video encoding apparatus is transmitted to a video decoding apparatus by using a transmission data unit that is appropriate for a protocol or a format of a communication channel, a storage medium, a video editing system, or a media framework.

In order to reproduce video data, the video decoding apparatus may restore the video data according to one of a trick play method and a normal play method and may reproduce the video data. The trick play method includes a random access method. The normal play method involves reproducing the video data by sequentially processing all pictures included in the video data. The random access method involves first reproducing a random access point (hereinafter, "RAP") picture that is independently restorable. According to the related art H.264 standard, only an Instantaneous Decoder Refresh (IDR) picture is used as the RAP picture. The IDR picture is only composed of slices that refresh a decoding apparatus when a corresponding picture is decoded. In more detail, when the IDR picture is decoded, a decoded picture buffer (DPB) marks pictures, except for the IDR picture, as unused for reference pictures, wherein the pictures were previously decoded before the IDR picture, and a picture order count (POC) is also initialized. Also, pictures that are decoded after the IDR picture may always trail the IDR picture in a display order and may be decoded without referring to the pictures that precede the IDP picture.

According to an exemplary embodiment, a clean random access (CRA) picture and a broken link access (BLA) picture, other than the IDR picture, may be used as the RAP picture. The CRA picture is composed of only I slices and indicates a picture having pictures that are previous in the display order but are encoded after the CRA picture in an encoding order. The picture that is precedent in the display order but is encoded after the CRA picture in the encoding order is defined as a leading picture. The BLA picture is obtained by finely classifying the CRA picture according to splicing positions. Whether the CRA picture has the leading picture, or whether the CRA picture has a random access decodable leading (RADL) picture or a random access skip leading (RASL) picture, the CRA picture may be classified as the BLA picture. Basically, the BLA picture is processed in a same manner as the CRA picture, thus, hereinafter, it is assumed that the CRA picture is used as the RAP picture. Each of a decoding order and an encoding order means an order by which a decoding apparatus and an encoding apparatus process a picture. The encoding apparatus sequentially encodes pictures according to an order of input pictures and outputs the encoded pictures, and the decoding apparatus decodes the encoded pictures according to a reception order, thus, an encoding order and a decoding order of the pictures are the same.

The IDR picture and the CRA picture are in common in that they are RAP pictures that may be encoded without referring to another picture. However, a picture that trails the IDR picture in the encoding order does not precede the IDR picture in a display order, but in a case of the CRA picture, the CRA picture includes a leading picture that trails the CRA picture in the encoding order but is precedent in the display order.

A POC that indicates a display order of each of pictures with respect to the IDR picture is used in determining an output point of time of a decoded picture and in determining a reference picture set that is used in prediction-decoding each picture, thus, POC information of each picture is important in video processing.

The POC is reset as 0 when the IDR picture is decoded, and pictures that are displayed before a next IDR picture after the IDR picture is decoded have the POC that increases by +1. An explicit method is used in signaling the POC. The explicit method involves classifying the POC into Most Significant Bits (MSBs) composed of m (here, m is an integer) upper bits and Least Significant Bits (LSBs) composed of n (here, n is an integer) lower bits, and transmitting the LSBs as the POC information of each picture. A decoder may obtain MSBs of a POC of a current picture, based on MSBs and LSBs of a POC of a previous picture and LSBs information of the POC of the current picture.

Figure 14:
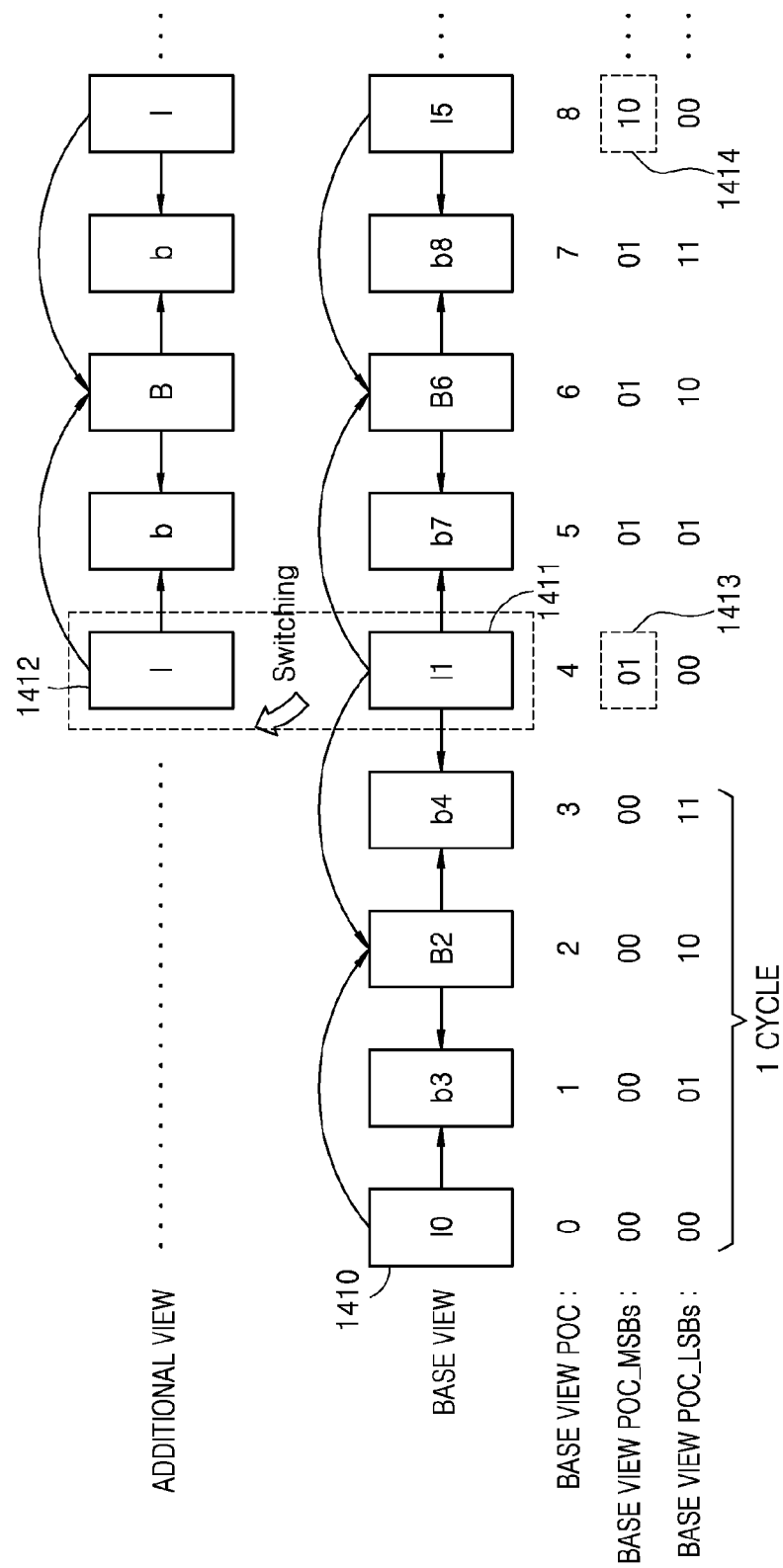
FIG. 14 illustrates a picture order count (POC) of a base-view picture included in a multiview video, and a relation between a base-view POC_MSBs and a base-view POC_LSBs that are obtained by classifying the POC of the base-view picture.

FIG. 14 illustrates a POC of a base-view picture included in a multiview video, and a relation between a base-view POC_MSBs and a base-view POC_LSBs that are obtained by classifying the POC of the base-view picture. In FIG. 14, an arrow mark indicates a reference direction. Also, I# indicates an I picture that is #$^{th}$ decoded, and b# or B# indicates a B picture that is bi-directionally predicted and is #$^{th}$ decoded by referring to a reference picture according to the arrow. For example, a B2 picture is decoded by referring to an I0 picture and an I1 picture.

Referring to FIG. 14, base-view pictures are decoded in an order of I0, I1, B2, b3, b4, I5, B6, b7, and b8. According to POC values, the base-view pictures are displayed in an order of I0, b3, B2, b4, I1, b7, B6, b9, and I5. In order to determine a display order that is different from the decoding order, POC information of each of the base-view pictures has to be signaled. As described above, during an explicit mode, the POC is classified into MSBs composed of upper bits and LSBs composed of lower bits, and only the LSBs that are the lower bits may be transmitted as the POC information.

An I0 picture 1410 is an IDR picture that is first decoded from among the base-view pictures. As described above, since the POC is reset as 0 when the IDR picture is decoded, the I0 picture 1410 has a POC that is 0. When it is assumed that the number of bits of LSBs of a POC is 2 bits, as illustrated, LSBs of an POC of each of the base-view pictures have a form in which "00 01 10 11" is repeated. When one cycle of "00 01 10 11" that may be expressed by using lower bits is completed, MSBs of the POC are increased by +1. Even when the decoding apparatus receives only information about LSBs of a POC, the decoding apparatus increases a value of MSBs of the POC by +1 when one cycle of displayed pictures is completed during a decoding procedure, and by doing so, the decoding apparatus may obtain the MSBs of the POC of each of the base-view pictures. Then, the decoding apparatus may restore a POC of a picture by using MSBs and LSBs. For example, a process of restoring a POC of an I1 picture 1411 is described below. With respect to the I1 picture 1411, information "00" of LSBs of the POC is obtained by using a predetermined data unit. Since a value of LSBs of a POC of a previous picture b4 that is displayed before the I1 picture 1411 is "11", and a value of LSBs of the POC of the I1 picture 1411 is "00", "01" 1413 may be obtained as a value of MSBs of the POC of the I1 picture 1411 by increasing a value of MSBs of the POC of the previous picture b4 by +1. When the MSBs and the LSBs are obtained, a binary value "0100" that corresponds to 4 that is a value of the POC of the I1 picture 1411 may be obtained via MSBs+LSBs.

As described above, transmitting only LSBs information of a POC is not difficult in a uni-view video, but in a case where inter-view random access or inter-view switching occurs in a multiview video, POCs of inter-view pictures may be asynchronous. For example, it is assumed that, while a base-view image is reproduced, random access to an additional-view image or inter-view switching occurs so that an I picture 1412 that is a RAP picture with an additional view is reproduced. The decoding apparatus resets, as 0, MSBs of a POC of the I picture 1412 with the additional view that is first decoded due to the random access. Thus, the POC of the I picture 1412 with the additional view has the MSBs that are reset as "00" due to the random access whereas a POC of an I picture 1411 with a base-view has MSBs of "01" 1413. Due to that, the I picture 1411 with the base-view and the I picture 1412 with the additional view that have to have a same POC have different POCs, such that a display order of base-view images may not match a display order of additional-view images.

Thus, according to an exemplary embodiment, even when inter-view random access or view switching where a reproduction time is changed occurs in the multiview video, in order to synchronize pictures that have to be displayed at a same point of time in each view, not only LSBs information of a POC but also MSBs information of the POC with respect to a CRA picture and a BLA picture from among RAP pictures are transmitted. In a case of an IDR picture, all of MSBs and LSBs of a POC are set as 0 and thus the IDR picture has the POC of which value is 0. Thus, when a picture of any layer included in a same access unit is the IDR picture, the decoder sets pictures of other corresponding layers as IDR pictures and does not separately transmit POC information with respect to the IDR pictures. In a case where inter-layer random access occurs so that an IDR picture of the RAP picture is first reproduced, since IDR pictures of layers have a same POC value, the IDR pictures may be synchronized.

According to another exemplary embodiment, POC information about only base-view pictures of a multiview video may be transmitted, and POC information that is determined with respect to the base-view pictures may be used for additional-view pictures, other than the base-view pictures. In more detail, an encoder transmits the POC information about only the base-view pictures and does not transmit separate POC information about the additional-view pictures. In order to changelessly use the POC information about a base-view as POC information about an additional-view, it is required to control a base-view picture and an additional-view picture to have a same type, wherein the base-view picture and the additional-view picture are included in a same access unit and are transmitted. In other words, if the base-view picture is an IDR picture, the additional-view picture that is included in a same access unit and is transmitted is also an IDR picture, and if the base-view picture is a non-IDR picture, the corresponding additional-view picture has to be a non-IDR picture. In a case where the base-view picture is the IDR picture whereas the corresponding additional-view picture is not the IDR picture, a position of the IDR picture of which POC is initialized as 0 becomes different such that POC information about the base-view picture cannot be used as POC information about the corresponding additional-view picture.

In another exemplary embodiment, in order to changelessly use POC information about a base-view as POC information about an additional-view, the encoder may transmit a base-view image and an additional-view image that have a same POC by using a same access unit, and the decoder may use POC information obtained with respect to the base-view image as POC information of another additional-view image included in the same access unit, so that synchronization between pictures of a multiview image may be achieved.

Figure 15:
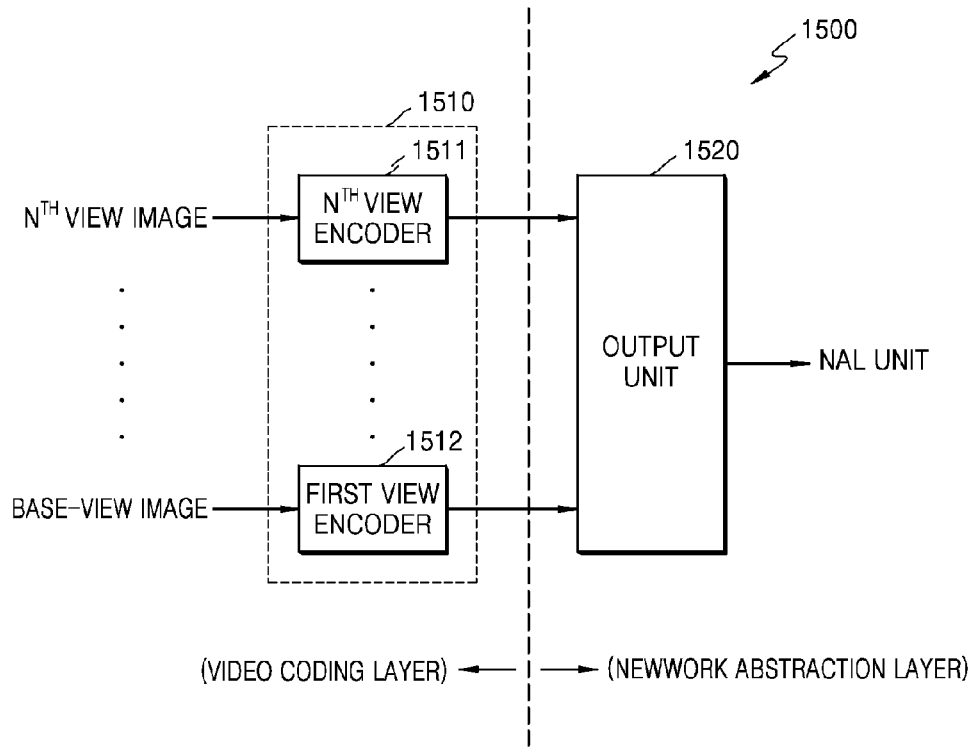
FIG. 15 illustrates a configuration of a multiview video encoding apparatus, according to an exemplary embodiment.

FIG. 15 illustrates configuration of a multiview video encoding apparatus, according to an exemplary embodiment.

Referring to FIG. 15, a multiview video encoding apparatus 1500 according to the present exemplary embodiment includes a multiview image encoder 1510 and an output unit 1520 (e.g., outputter).

The multiview image encoder 1510 corresponds to a video coding layer. The output unit 1520 corresponds to a network abstraction layer for generating encoded multiview video data and additional information as transmission unit data according to a predetermined format. According to an exemplary embodiment, the transmission unit data may be an NAL unit. Also, POC information of a CRA picture and a BLA picture may be included in one of a sequence parameter set (SPS), a picture parameter set (PPS), an adaptation parameter set (APS), and a slice header. Header information of a predetermined data unit including the POC information of the CRA picture and the BLA picture may be included in an NAL unit having a predetermined identifier and may be transmitted.

The multiview image encoder 1510 according to an exemplary embodiment generates a plurality of multiview image streams by encoding n (where n is an integer) multiview images that configure a multiview video. The multiview image encoder 1510 may include n encoders 1511 and 1512 that encode the n multiview images. The first view encoder 1512 encodes a base-view image, and the $n^{th}$ view encoder 1511 encodes an $n^{th}$-view image. Each of images that configure the n multiview images may be encoded by the multiview image encoder 1510, so that image streams of n views may be output.

The multiview video encoding apparatus 1500 according to an exemplary embodiment may encode an image of each layer by using coding units of a hierarchical tree structure that are described above with reference to FIGS. 1 through 13. The coding units of the tree structure may include a maximum coding unit, a coding unit, a prediction unit, a transformation unit, etc.

The output unit 1520 applies first POC information and second POC information to a predetermined data unit header that includes information of a CRA picture included in each of image streams of views, wherein the first POC information is used in determining MSBs that are a first portion value of a POC of the CRA picture and the second POC information is about LSBs that are a second portion value. The CRA pictures that correspond to each other in each of the views have the same MSBs and LSBs so as to have a same POC value.

The output unit 1520 may determine a display order of a CRA picture included in a base-view, based on an IDR picture of the base-view. That is, the output unit 1520 determines a POC of the CRA picture by determining a time when the CRA picture is displayed, based on the IDR picture that precedes the CRA picture. Then, in a case where a binary value that corresponds to the POC of the CRA picture is composed of m (where m is an integer) upper bits and n (where n is an integer) lower bits, the output unit 1520 may add first POC information and second POC information to the predetermined data unit header including information about the CRA picture, wherein the first POC information is about the m upper bits and the second POC information is about the n lower bits. It is assumed that a value of a POC is composed of 2 bits of upper bits (MSBs) and 2 bits of lower bits (LSBs). In this case, a binary value "0111" that corresponds to a POC value of 7 that is POC information of a CRA picture having the POC value of 7 since the CRA picture is $7^{th}$ displayed with respect to a previous IDR picture may be classified into 2 upper bits "01" and 2 lower bits "11", and information of upper bits (MSBs) and lower bits (LSBs) may be added to one of a slice header including information about the CRA picture, an SPS, a PPS, and an APS.

Also, when an order of $(2^n)$ that may be expressed by using n lower bits is defined as one cycle, if the CRA picture is displayed in $x*(2^n)^{th}$ order (where x is an integer) or in $\{(x+1)*(2^n)-1\}^{th}$ order with respect to an IDR picture, a value of x that indicates the number of times that one cycle is repeated may be added as the first POC information to one of the slice header, the SPS, the PPS, and the APS.

With respect to the BLA picture, in an equal manner as the CRA picture, the output unit 1520 may apply first POC information and second POC information to one of the slice header, the SPS, the PPS, and the APS, wherein the first POC information is used in determining MSBs of a POC of the BLA picture and the second POC information is about LSBs.

Also, the output unit 1520 adds POC information of a base-view picture to a predetermined data unit header including information of the base-view picture, skips a procedure of encoding POC information about an additional-view picture having a same POC as the base-view picture, multiplexes, as a same access unit, the base-view picture and the additional-view picture that have a same POC, and outputs the base-view picture and the additional-view picture.

Figure 16:
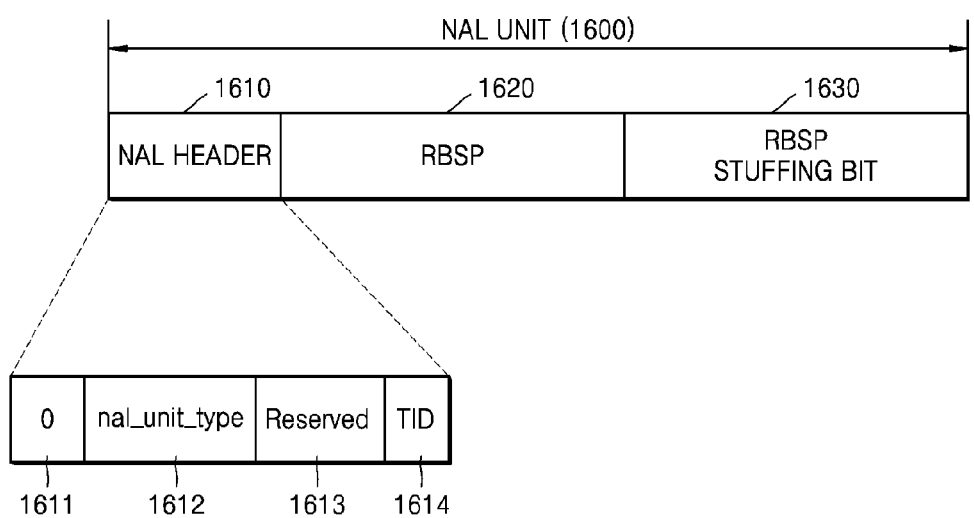
FIG. 16 illustrates an NAL unit, according to an exemplary embodiment.

FIG. 16 illustrates an NAL unit, according to an exemplary embodiment.

An NAL unit 1600 is widely divided into an NAL header 1610 and a raw byte sequence payload (RBSP) 1620. A RBSP stuffing bit 1630 is a length adjusting bit that is attached to an end of an RBSP 1620 so as to express a length of the RBSP 1620 as a multiple of 8 bits. The RBSP stuffing bit 1630 has a pattern such as '100 . . . ' that starts from 1 and thereafter comprises '0's that are determined according to a length of the RBSP 1620. By searching for '1' that is an initial bit value of the RBSP stuffing bit 1630, a last bit position of the RBSP 1620 that is just before '1' may be determined.

The NAL header 1610 includes a forbidden_zero_bit 1611 having a value of 0 and an nal_unit_type 1612 that is an identifier for indicating which information is included in the NAL unit 1600. The POC information of the CRA picture according to an exemplary embodiment includes information about the CRA picture and is transmitted by using a predetermined NAL unit.

Also, the NAL header 1610 may include a reserved region 1613 that is reserved for future use, and a temporal identifier (TID) 1614.

FIG. 17 illustrates types of an NAL unit based on values of an identifier (i.e., nal_unit_type) of the NAL unit.

Referring to FIG. 17, an NAL unit of which nal_unit_type has a value of 21 may be set to include information about a CRA picture. In this case, the output unit 1520 may add first POC information and second POC information to a slice header of the CRA picture that is included in the NAL unit of which nal_unit_type has the value of 21 and may transmit them, wherein the first POC information is used in determining MSBs of a POC of the CRA picture and the second POC information indicates LSBs. However, it is not limited to the types shown in FIG. 17, and the types of the NAL unit based on the values of the nal_unit_type of the NAL unit that configures the information about the CRA picture may vary.

FIG. 18 illustrates slice header information of a CRA picture that is included in an NAL unit and is transmitted, according to an exemplary embodiment.

It is assumed that nal_unit_type that includes information about the CRA picture is 4. In a case where a current NAL unit includes the slice header information of the CRA picture, a slice header includes first POC information poc_order_cnt_msb 1810 that is used in determining MSBs of a POC of the CRA picture. The first POC information poc_order_cnt_msb 1810 may be information about m upper bits of the POC of the CRA picture. Also, the slice header includes second POC information pic_order_cnt_lsb 1820 that indicates LSBs of the POC of the CRA picture.

FIG. 19 illustrates slice header information of a CRA picture that is included in an NAL unit and is transmitted, according to another exemplary embodiment.

It is assumed that nal_unit_type that includes information about the CRA picture is 4. In a case where a current NAL unit includes the slice header information of the CRA picture, a slice header includes first POC information poc_order_cnt_msb_cycle 1910 that is used in determining MSBs of a POC of the CRA picture. If the CRA picture is displayed in $x*(2^n)^{th}$ order (where, x is an integer) or in $\{(x+1)*(2^n)-1\}^{th}$ order with respect to a previous IDR picture, the first POC information poc_order_cnt_msb_cycle 1910 may be a value of x that indicates the number of times that one cycle is repeated. Also, the slice header includes second POC information pic_order_cnt_lsb 1920 that indicates LSBs of the POC of the CRA picture.

Figure 20:
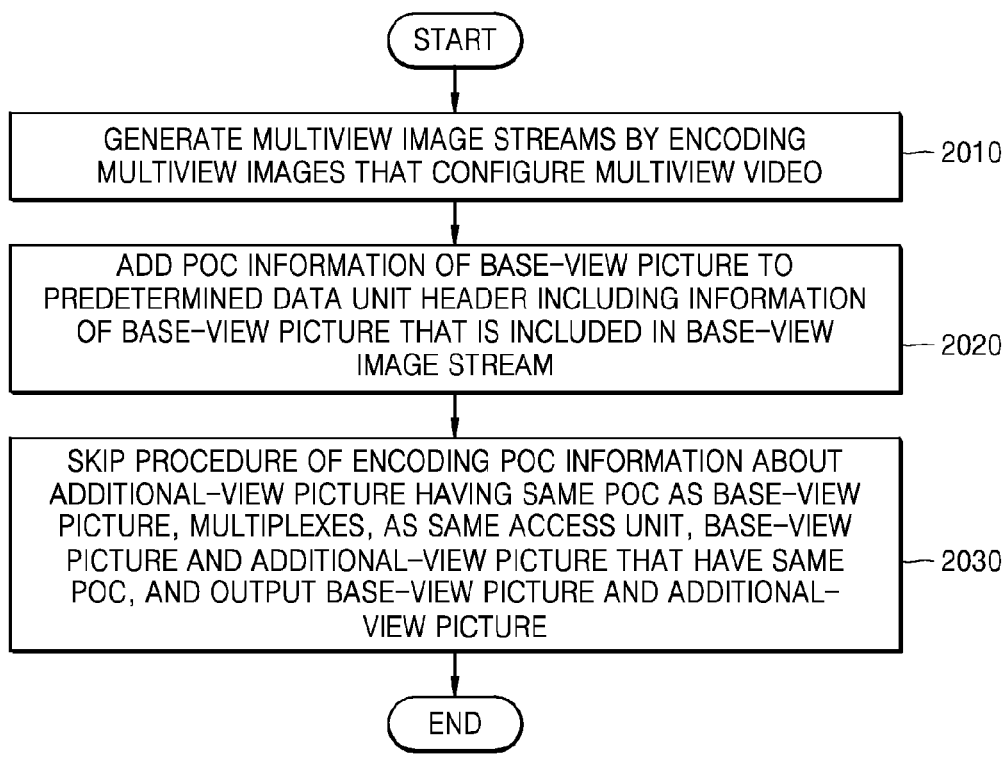
FIG. 20 is a flowchart of a method of encoding a multi-view video, according to an exemplary embodiment.

FIG. 20 is a flowchart of a method of encoding a multiview video, according to an exemplary embodiment.

Referring to FIG. 20, in operation 2010, the multiview image encoder 1510 generates multiview image streams by encoding multiview images that configure a multiview video.

In operation 2020, the output unit 1520 adds POC information of a base-view picture to a predetermined data unit header including information of the base-view picture that is included in a base-view image stream. In more detail, the output unit 1520 adds first POC information to the predetermined data unit header including information of a CRA picture of a base-view, wherein the first POC information is used in determining MSBs that are a first portion value of a POC of the CRA picture. The output unit 1520 may determine the POC of the CRA picture that is encoded based on a previous IDR picture. In a case where a binary value that corresponds to the POC of the CRA picture is composed of m upper bits and n lower bits, the output unit 1520 may add first POC information and second POC information to one of a slice header including the information about the CRA picture, an SPS, a PPS, and an APS, wherein the first POC information is about the m upper bits and the second POC information is about the n lower bits.

Also, when an order of $(2^n)$ that may be expressed by using the n lower bits is defined as one cycle, if the CRA picture of the base-view is displayed in $x*(2^n)^{th}$ order (where x is an integer) or in $\{(x+1)*(2^n)-1\}^{th}$ order with respect to an IDR picture, the output unit 1520 may add a value of x, as the first POC information, to one of the slice header, the SPS, the PPS, and the APS, wherein the value of x indicates the number of times that one cycle is repeated. Also, the output unit 1520 may add the second POC information to one of the slice header including the information about the CRA picture of the base-view, the SPS, the PPS, and the APS, wherein the second POC information indicates LSBs that are the n lower bits of the POC of the CRA picture of the base-view.

In operation 2030, the output unit 1520 skips a procedure of encoding POC information about an additional-view picture having a same POC as the base-view picture, multiplexes, as a same access unit, the base-view picture and the additional-view picture that have a same POC, and outputs the base-view picture and the additional-view picture. As described above, the POC information about only the base-view pictures of the multiview video may be transmitted, and the POC information that is determined with respect to the base-view pictures may be used for the additional-view pictures, other than the base-view picture. As described above, images of views that correspond to each other are set to be a same type of pictures. In other words, if the base-view picture is an IDR picture, the additional-view picture that is included in a same access unit and is transmitted is also an IDR picture, and if the base-view picture is a non-IDR picture, the corresponding additional-view picture is set as a non-IDR picture.

In a case of the IDR picture, its POC is reset as 0, and thus, only predetermined flag information IdrPicFlag indicating that it is the IDR picture is transmitted, and separate POC information about the IDR picture is not transmitted. Also, information related to an MSB and an LSB of a POC of each of the CRA picture and the BLA picture may be transmitted, and only LSB information of a POC of a non-RAP picture of the base-view may be transmitted.

Figure 21:
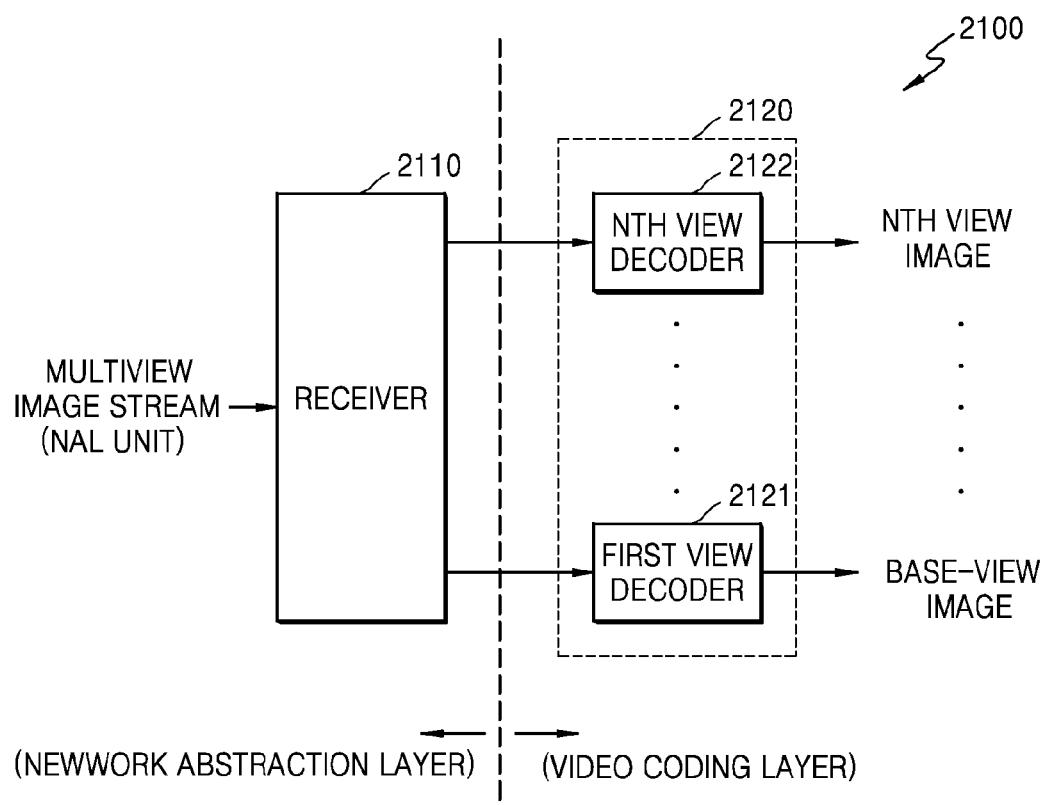
FIG. 21 illustrates a configuration of a multiview video decoding apparatus, according to an exemplary embodiment.

FIG. 21 illustrates a configuration of a multiview video decoding apparatus, according to an exemplary embodiment.

Referring to FIG. 21, a multiview video decoding apparatus 2100 according to an exemplary embodiment includes a receiver 2110 and a multiview image decoder 2120.

The receiver 2110 receives a plurality of multiview image streams that configure an encoded multiview video. The multiview image stream may be received by an NAL unit. The receiver 2110 obtains POC information of a base-view picture from a predetermined data unit header that includes information of the base-view picture included in a base-view image stream. If the base-view picture is not an IDR picture but is a RAP picture, the receiver 2110 obtains first POC information and second POC information from the predetermined data unit header, wherein the first POC information is used in determining MSBs of a POC of the RAP picture of the base-view and the second POC information is used in determining LSBs of the POC of the RAP picture. As described above, the RAP picture may be a CRA picture or a BLA picture. In a case where a binary value that corresponds to a POC of the CRA picture of the base-view is composed of MSBs that are m upper bits and LSBs that are n lower bits, the receiver 2110 may read first POC information about the MSBs and second POC information about the LSBs from the predetermined data unit header that includes information about the CRA picture of the base-view. As described above, the data unit header may be one of a slice header including the information about the CRA picture, an SPS, a PPS, and an APS.

When the receiver 2110 receives information about the MSBs and the LSBs of the POC of the CRA picture of the base-view, the receiver 2110 may restore the POC of the CRA picture of the base-view via MSBs+LSBs.

When the CRA picture of the base-view is displayed in $x*(2^n)^{th}$ order (where x is an integer) or in $\{(x+1)*(2^n)-1\}^{th}$ order with respect to an IDR picture, and a value of x indicating the number of times that one cycle is repeated is transmitted as first POC information, if a value of the one cycle is MaxPicOrderCntLsb, the receiver 2110 may calculate a value of x*MaxPicOrderCntLsb and thus may obtain MSBs information of the POC. As described above, when the n lower bits are used, MaxPicOrderCntLsb may be $(2^n)$, and when the value of x indicating the number of times that the one cycle is repeated is transmitted as the first POC information, the receiver 2110 may restore the MSBs of the POC of the CRA picture of the base-view by obtaining a value of $x*(2^n)$.

A POC of non-RAP pictures other than the RAP picture of the base-view may be determined based on an MSB of a previous picture and LSB information that is included in a data unit and is transmitted.

When the receiver 2110 determines the POC of the base-view picture, the receiver 2110 determines, by using the POC of the base-view picture, a POC of an additional-view picture that is included in a same access unit as the base-view picture and is transmitted.

As described above, since additional-view pictures share transmitted POC information about base-view pictures, synchronization between multiview images may be achieved.

Referring back to FIG. 21, the multiview image decoder 2120 decodes the plurality of multiview image streams. The multiview image decoder 2120 may include n decoders 2121 and 2122 that decode n multiview images.

Figure 22:
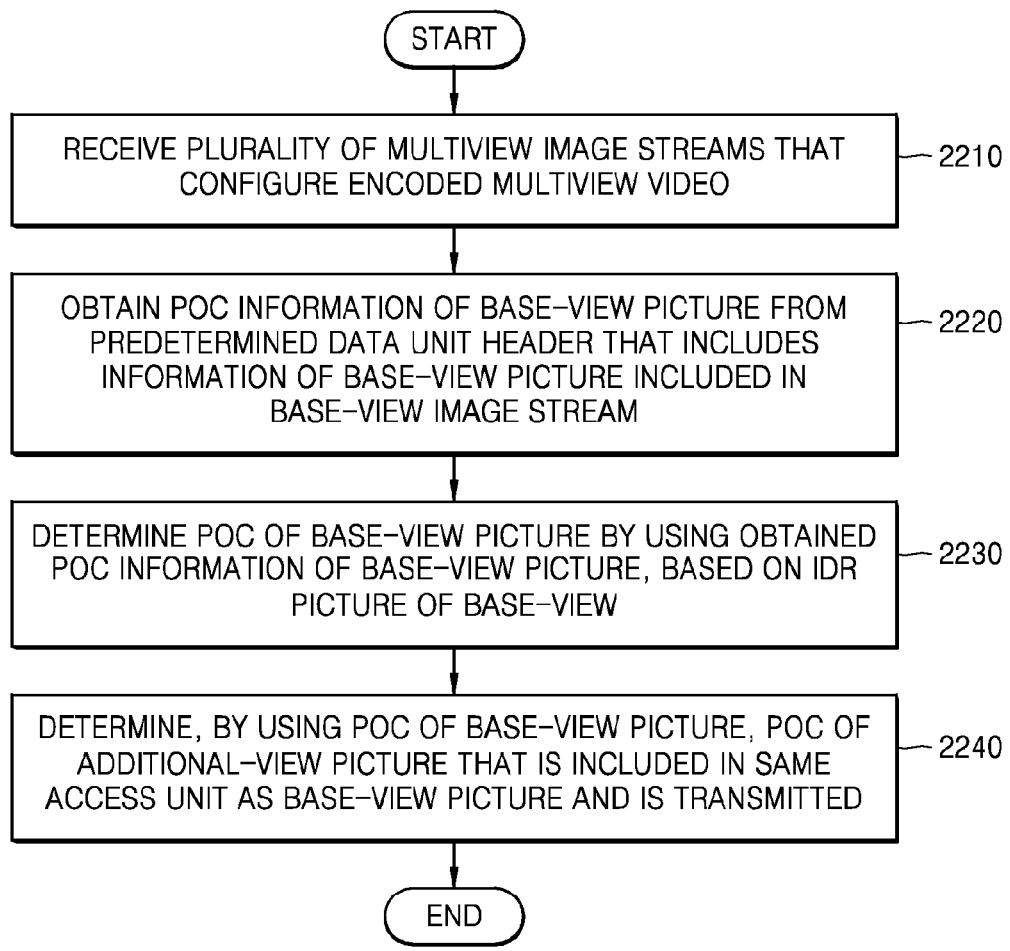
FIG. 22 is a flowchart of a method of decoding a multi-view video, according to an exemplary embodiment.

FIG. 22 is a flowchart of a method of decoding a multiview video, according to an exemplary embodiment.

Referring to FIG. 22, in operation 2210, the receiver 2110 receives a plurality of multiview image streams that configure an encoded multiview video.

In operation 2220, the receiver 2110 obtains POC information of a base-view picture from a predetermined data unit header that includes information of the base-view picture included in a base-view image stream from among the multiview image streams.

In operation 2230, the receiver 2110 determines a POC of the base-view picture by using the obtained POC information of the base-view picture. As described above, if the base-view picture is not an IDR picture but is a RAP picture, the receiver 2110 may obtain first POC information and second POC information from the predetermined data unit header, wherein the first POC information is used in determining MSBs of a POC of the RAP picture of the base-view and the second POC information is used in determining LSBs of the POC of the RAP picture, and may determine a POC of base-view RAP pictures based on the first POC information and the second POC information. A POC of non-RAP pictures other than the base-view RAP pictures may be determined based on an MSB of a previous picture and LSB information that is included in a data unit and is transmitted.

In operation 2240, the receiver 2110 determines, by using the POC of the base-view picture, a POC of an additional-view picture that is included in a same access unit as the base-view picture and is transmitted. That is, the receiver 2110 equally sets the POC of the base-view picture and the POC of the additional-view picture that are included in the same access unit and are transmitted.

One or more exemplary embodiments may be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Furthermore, it is understood that any of the above-described elements may be implemented in or by at least one processor.

While exemplary embodiments have been particularly shown and described above, it will be understood by those of ordinary skill in the art that various changes in form and details may be made therein without departing from the spirit and scope of the inventive concept as defined by the appended claims. Exemplary embodiments should be considered in a descriptive sense only and not for purposes of limitation. Therefore, the scope of the invention is defined not by the detailed description of exemplary embodiments, but by the appended claims, and all differences within the scope will be construed as being included in the present invention.

The invention claimed is:

1. A method of decoding a multiview video, the method comprising:
   receiving multiview image streams that configure the multiview video;
   obtaining, from a predetermined data unit header comprising information of a base-view picture comprised in a base-view image stream, picture order count (POC) information of the base-view picture;
   determining, using the POC information of the base-view picture, a POC of the base-view picture, based on an instantaneous decoding refresh (IDR) picture of a base-view; and determining, using the POC of the base-view picture, a POC of an additional-view picture that is comprised in a same access unit as the base-view picture and is transmitted, wherein the determining of the POC of the base-view picture comprises using the obtained POC information of the base-view picture to check if the base-view picture is not an IDR picture but is a Random Access Point (RAP) picture or a non-RAP picture, and:

if the base-view picture is a RAP picture then obtaining first POC information and second POC information from the predetermined data unit header, wherein the first POC information is used to determine MSBs of the POC of the RAP picture, and the second POC information is used to determine LSBs of the POC of the RAP picture, if the base-view picture is a non-RAP picture then determining the POC of the non-RAP picture based on an MSB of a previous picture and LSB information that is included in the transmitted data unit, and wherein the determining of the POC of the additional-view picture comprises equally setting the POC of the additional-view picture to the POC of the base-view picture.

2. The method of claim 1, wherein if the base-view picture is an IDR picture, the additional-view picture corresponding to the base-view picture is an IDR picture;

if the base-view picture is a non-IDR picture, the additional-view picture corresponding to the base-view picture is a non-IDR picture; and the base-view picture and the additional-view picture that are comprised in the same access unit and are transmitted have a same type.

3. The method of claim 1, wherein, if the base-view picture is a random access point picture of one of a clean random access (CRA) picture and a broken link access (BLA) picture that are randomly accessible, and a binary value that corresponds to the POC of the base-view picture is composed of m upper bits and n lower bits, where m and n are integers, the POC information of the base-view picture comprises information about the m upper bits and information about the n lower bits.

4. The method of claim 1, wherein:

if the base-view picture is a random access point picture of one of a CRA picture and a BLA picture that are randomly accessible, a binary value that corresponds to the POC of the base-view picture is composed of m upper bits and n lower bits, where m and n are integers, and when an order of $(2^n)$ that can be expressed by using the n lower bits is defined as one cycle, if the base-view picture is displayed in $x*(2^n)^{th}$ order (where x is an integer) or in $\{(x+1)*(2^n)-1\}^{th}$ order with respect to the IDR picture, the POC information of the base-view picture comprises first POC information and second POC information; and the first POC information is information regarding a value of x that indicates a number of times that the one cycle is repeated and the second POC information is information regarding the n lower bits.

5. The method of claim 1, wherein, if the base-view picture is not a random access point picture and a binary value that corresponds to the POC of the base-view picture is composed of m upper bits and n lower bits, where m and n are integers, the POC information of the base-view picture comprises information about the n lower bits and does not comprise information about the m upper bits.

* * * * *